R. E. CARTZDAFNER AND H. A. KETCHAM.
VALVE MECHANISM.
APPLICATION FILED OCT. 28, 1916.

1,375,562.

Patented Apr. 19, 1921.
6 SHEETS—SHEET 1.

Roy E. Cartzdafner,
Horace A. Ketcham, Inventors

By their Attorneys
Emery, Booth, Janney & Varney

R. E. CARTZDAFNER AND H. A. KETCHAM.
VALVE MECHANISM.
APPLICATION FILED OCT. 28, 1916.
1,375,562.
Patented Apr. 19, 1921.
6 SHEETS—SHEET 2.
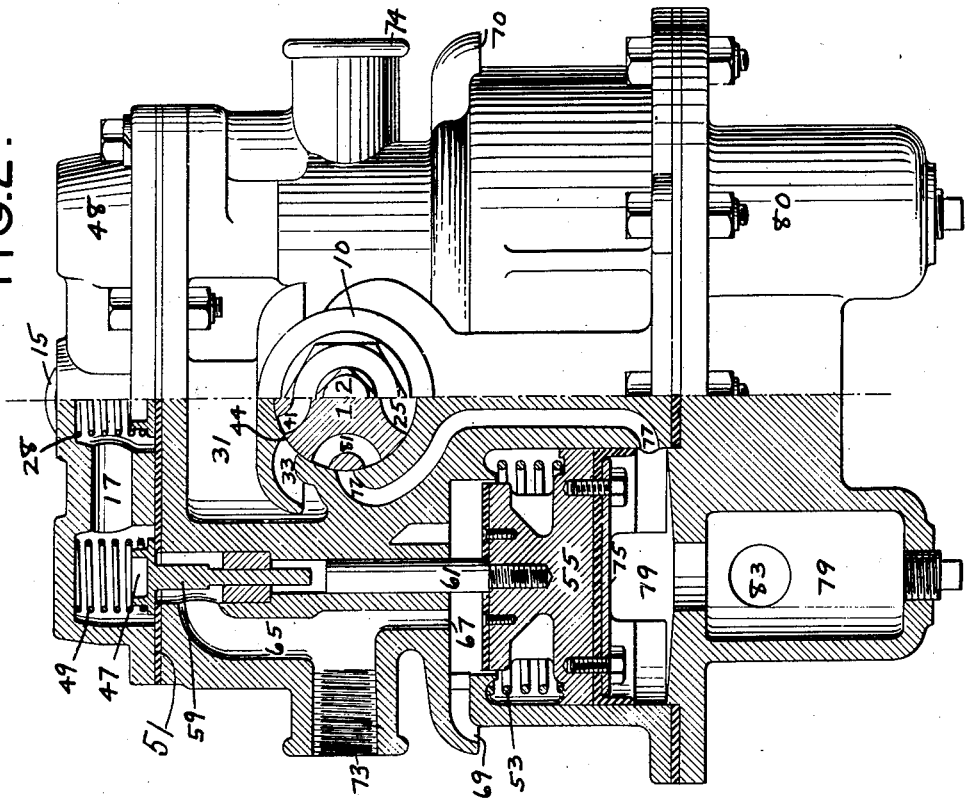
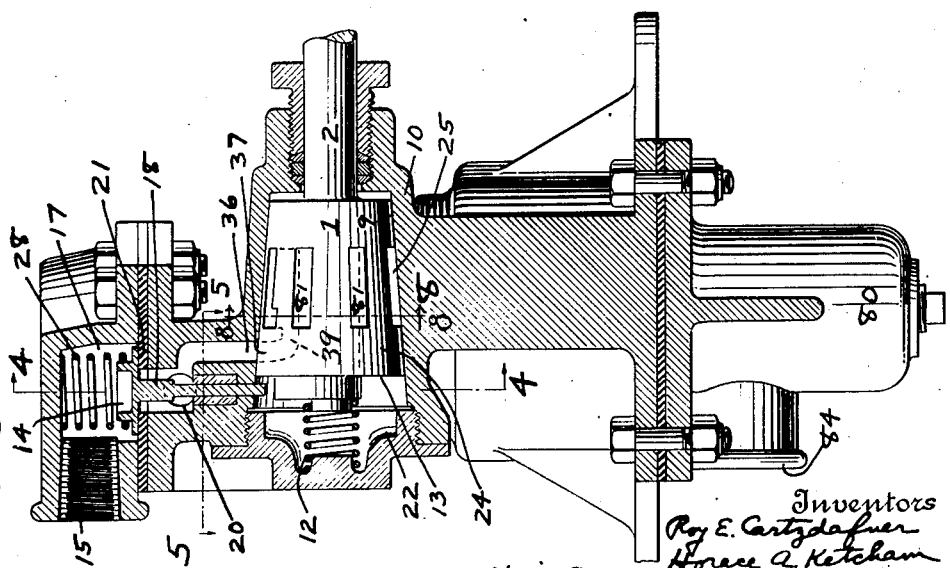
Inventors
Roy E. Cartzdafner
Horace A. Ketcham
By their Attorneys
Emery, Booth, Janney & Varney R. E. CARTZDAFNER AND H. A. KETCHAM.
VALVE MECHANISM.
APPLICATION FILED OCT. 28, 1916.

1,375,562.

Patented Apr. 19, 1921.
6 SHEETS—SHEET 3.

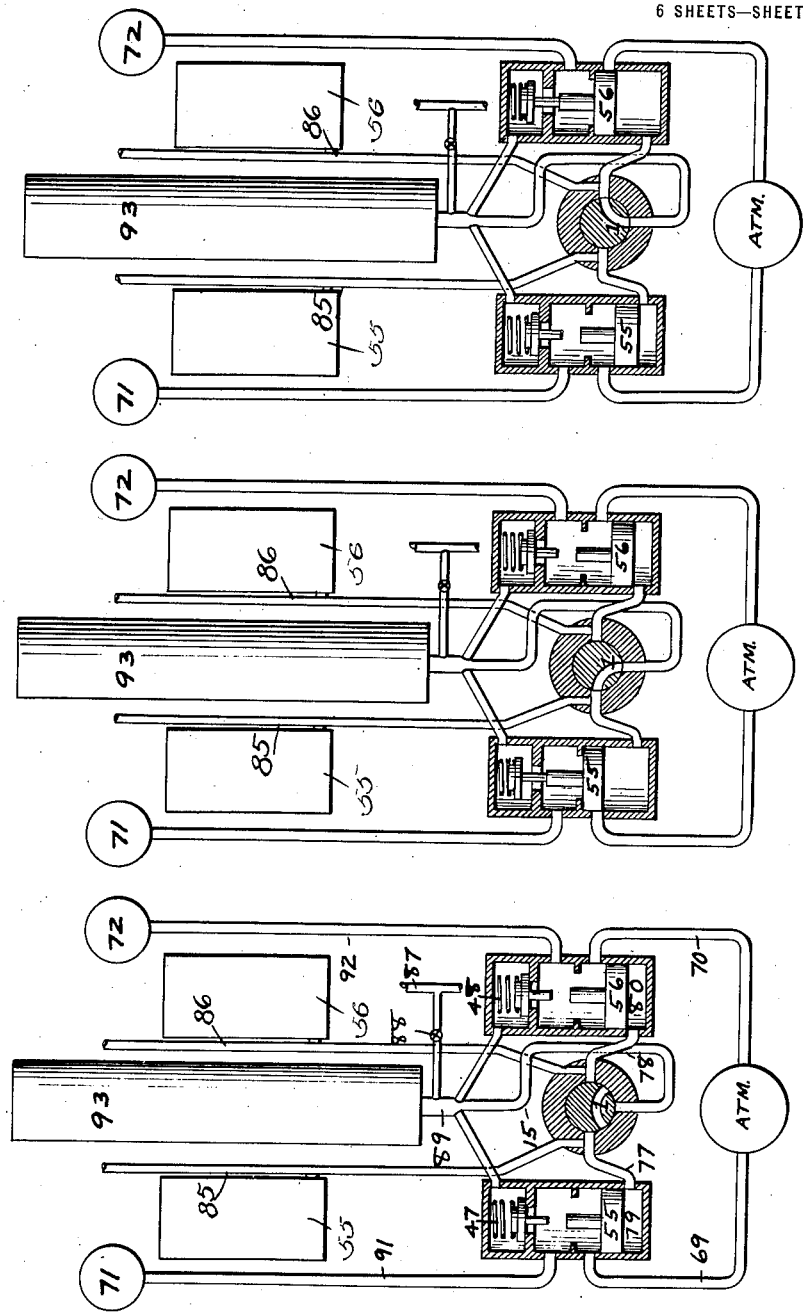

UNITED STATES PATENT OFFICE.

ROY E. CARTZDAFNER AND HORACE A. KETCHAM, OF PASSAIC, NEW JERSEY, ASSIGNORS, BY MESNE ASSIGNMENTS, TO MAGOR CAR CORPORATION.

VALVE MECHANISM.

1,375,562.   Specification of Letters Patent.   Patented Apr. 19, 1921.

Application filed October 28, 1916. Serial No. 128,349.

*To all whom it may concern:*

Be it known that we, ROY E. CARTZDAFNER and HORACE A. KETCHAM, both citizens of the United States, and both residents of Passaic, in the county of Passaic and State of New Jersey, have invented an Improvement in Valve Mechanism, of which the following is a specification.

This invention relates to the control of fluids, and with regard to certain more specific features, to a valve for controlling the passage of compressed air through systems such as those in use on dump-cars.

One of the objects of the invention is to provide a simple and inexpensive mechanism for controlling the flow of the fluid.

Another object is to provide a reliable valve for admitting air selectively to one of a plurality of work circuits, and simultaneously exhausting another work circuit.

Another object is to provide a dump-car valve uniting in a single mechanism all the combinations of air circuits required for the dumping and righting of one car or a plurality of cars.

Another object is to provide effective means for preventing compressed air from reaching a work circuit accidentally, as, for example, through leaks that might develop in the valve controlling said circuits.

Another object is to provide an effective and durable mechanism embodying a plunger automatically maintained in one position and automatically shifted from that position by the application of pressure from a reservoir at another point in the mechanism.

Another object is to provide a mechanism for applying pressure to one train-line and simultaneously opening another train-line to the atmosphere, and available as well for reversing the pneumatic connections by opening the first train-line to atmosphere and simultaneously applying pressure to the other line.

Other objects will be in part obvious and in part pointed out hereinafter.

The invention accordingly comprises the features of construction and operation, combinations of elements and arrangements of parts which are exemplified in the structure hereinafter described and the scope of the application of which will be indicated in the following claims.

In the accompanying drawings, in which is shown one of various possible embodiments of this invention, Figure 1 is a plan of a preferred type of valve.

Fig. 2 is a side elevation, partly in section on the line 2—2 of Fig. 1.

Fig. 3 is a vertical section on the line 3—3 of Fig. 1 looking from the left in Fig. 1.

Figure 7A:
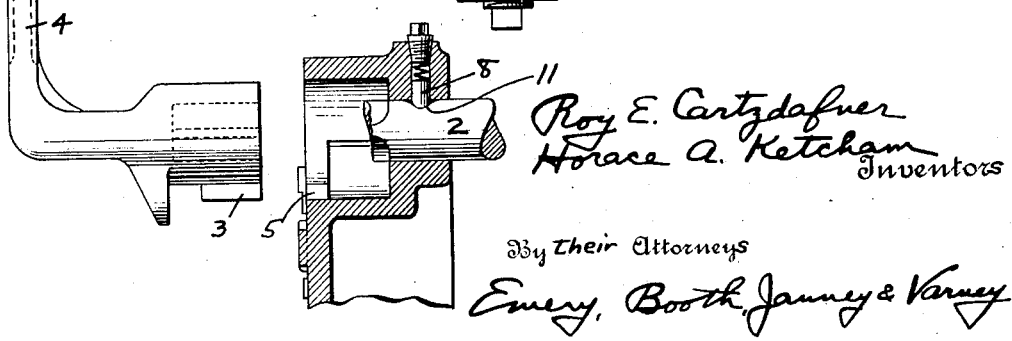
Figure 7:
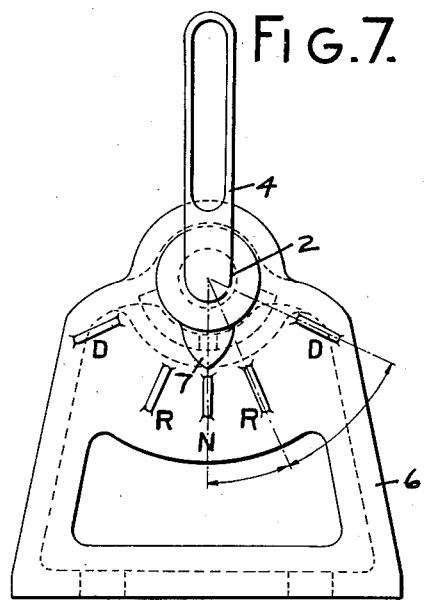

Figs. 7 and 7ª illustrate in a face view and side elevation (the latter partly in section), the operating implement and the scale plate associated therewith.

Figure 8:
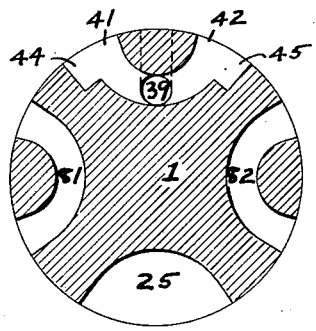

Fig. 8 is a vertical section on the line 8—8 of Fig. 3.

Figure 9:
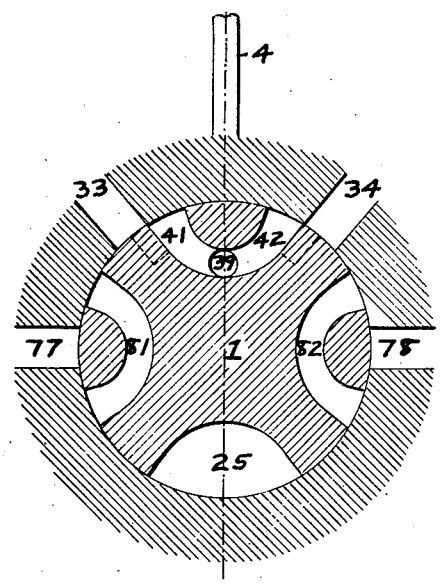
Figure 10:
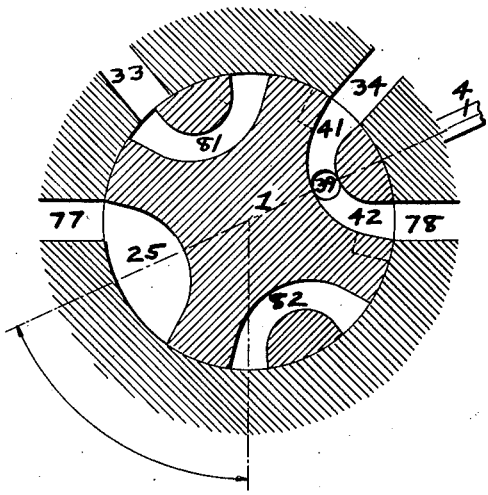
Figure 11:
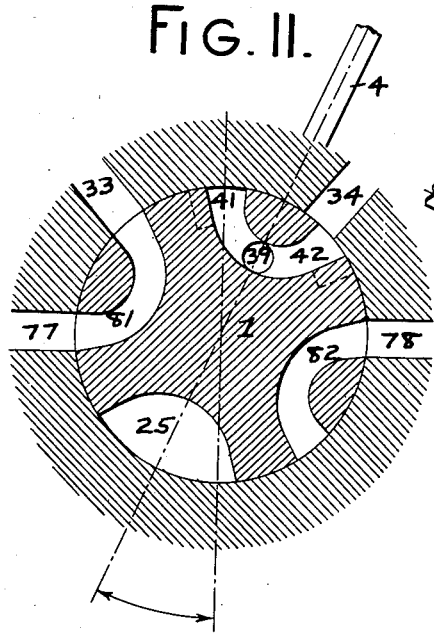
Figure 12:
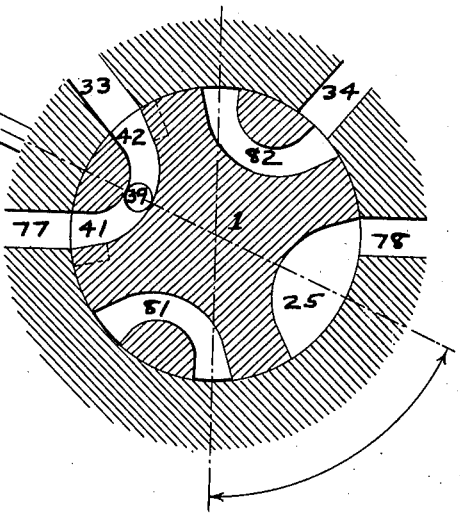
Figure 13:
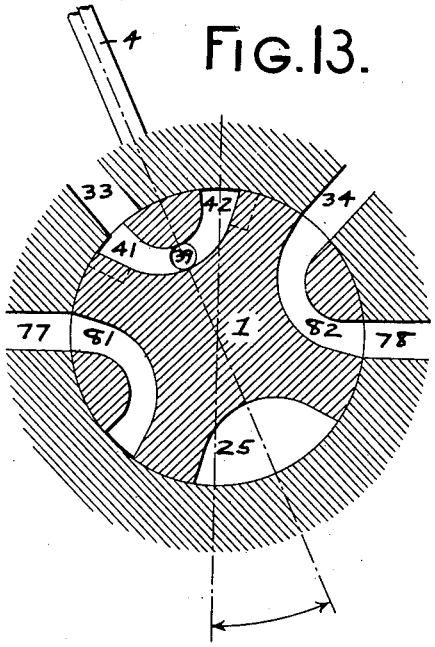
Figure 14:
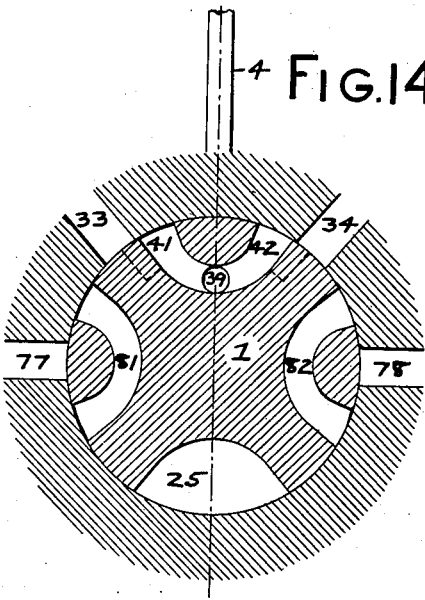

Figs. 9 to 14 illustrate diagrammatically the successive positions of rest of the valve in the operation of dumping toward the right and then righting the car; of these, Fig. 9 indicates the neutral position at the beginning of the operation, Fig. 10 the position during dumping toward the right, Fig. 11 the position of rest for exhausting the left-hand cylinder prior to the righting of the car from the right, Fig. 12 the position during righting from the right, Fig. 13 the position of rest to exhaust the right-hand cylinder, and Fig. 14 the final or neutral position.

Figs. 15, 16 and 17 are diagrammatic illustrations of the arrangement of circuits throughout the car when the valve is in its various operating positions; of these, Fig. 15 corresponds to the neutral position of the valve, Fig. 16 indicates the position for dumping toward the right or righting from the left, and Fig. 17 indicates the circuits during dumping toward the left or righting from the right.

Similar reference characters indicate similar parts throughout the several views of the drawings.

In considering this invention in relation to the prior art, it may be noted that for many years attempts have been made to control in a reliable and effective manner the flow of fluid such as compressed air through a system of circuits selectively energized by the manual or automatic operation of one or more valves. In circuits in which, for example, there are two pipes or lines both normally open to atmosphere and intended to be connected selectively to a reservoir or other source of pressure, it has ordinarily been found necessary or advisable to provide two or three or even more valves, each of a more or less complicated construction, in order to effect the various circuit connections and changes in proper timed relation to each other, and at the same time to prevent the application of reservoir pressure or any part of said pressure to any of the lines accidentally. The cost of construction, installation and maintenance of these comparatively elaborate valve systems has introduced disadvantages of unreliability and expense, as well as the apparently inherent tendency of a complicated mechanism whose parts are scattered, to get out of order in spite of regular inspection by competent workmen. In many fields, such as in pneumatically-operated dump-cars where an entire train is to be both dumped and righted by the operation of a single valve, and where the danger of accidental dumping makes safety a prime factor, there has long been a demand for a valve which would replace the plurality of valves heretofore ordinarily used on each car, and contribute to reliability and safety of operation. The item of expense is in many respects subservient to safety and reliability, but must of course be considered. As the description progresses, it will be seen that these defects of prior apparatus are eliminated, and the above requirements and desiderata, including low cost, are adequately met in the mechanism of the present invention.

Referring now to the accompanying drawings, and more particularly to Figs. 1 to 8 thereof, there is illustrated a valve comprising a central cone 1 secured upon a central shaft 2 squared at its outer end to receive an operating implement 4, Fig. 7, by means of which the cone 1 may be manually shifted from its vertical or neutral position N toward the left or right to the release positions R and dumping positions D, indicated on the scale plate 6 adjacent the path of travel of the pointer 7 of the handle 4. By providing a key 3 (Fig. 7ª) on the implement 4 registering with a key-hole 5 in the scale plate only when the implement is in neutral position, and so arranged that the key must be inserted through the key-hole before the implement is in operative engagement with the squared end of the shaft 2, the handle cannot be removed or inserted except when the valve is in neutral. A spring detent 8 (Fig. 7ª) registering with a notch 11 in the shaft 2 when the valve is in neutral, holds the valve in neutral position against accidental displacement.

The central cone on frustum 1 rotates within a conical or frusto-conical chamber or seat 9 formed in the shell 10, and is resiliently urged toward the smaller end of the frustum by a spring 12, to insure the requisite tightness of fit between cone and chamber. This cylindrical or conical construction of the rotating member 1, as will be seen from Fig. 3, permits the utilization of ports in different planes along the axis of the cone, as well as ports extending through the left face 13 (Fig. 3) of the cone. The arrangement of ports upon the cone and the connections from the adjacent passages to the other portions of the valve will be hereinafter described.

Above the cone 1 is a central puppet valve 14 normally spring-pressed downwardly to closed position but serving when open to admit air or other fluid from the reservoir port 15 and upper chamber or reservoir box 17 downwardly underneath the puppet 14 and around the stem 18 thereof (Figs. 3 and 4) into a pair of oppositely-disposed passages 19, 20, extending outwardly and then downwardly from the seat 21 of the puppet 14, and emerging in the chamber 22 at the left of the left face 13 of the cone, so that when the central puppet 14 is raised, reservoir air is free to pass from the reservoir port 15 and reservoir box 17 past the seat 21 of the central puppet, and thence through the downwardly extending passages 19, 20, into the chamber 22 at the left of the central cone 1. These passages 19, 20, are shown in sectional elevation in Fig. 4, and in transverse section in Fig. 5. The right-hand passage 20 is indicated in Fig. 3 simply by a circle, partly dotted to indicate that in Fig. 3 this passage is behind the stem 18 of the puppet 14. The chamber 22 is in constant communication with the reservoir channel 24 which extends from the left face 13 horizontally toward the front of the valve (toward the right in Fig. 3), communicating with a segmental port 25, indicated near the bottom of the cone in Figs. 2, 3 and 8. This port 25, which may be termed the reservoir port of the cone, is thus in communication with the reservoir through the reservoir port 15, reservoir box 17, passages 19, 20, chamber 22, and reservoir channel 24 in the cone 1, whenever the central puppet 14 is open.

Figure 1:
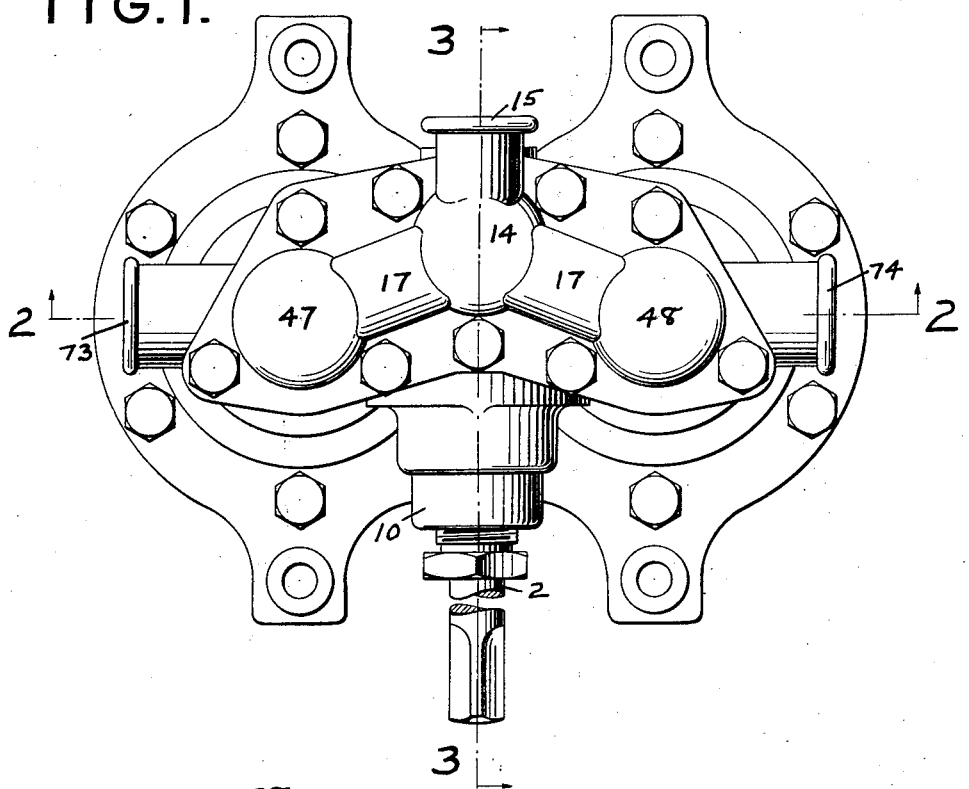
Figures 4, 5:
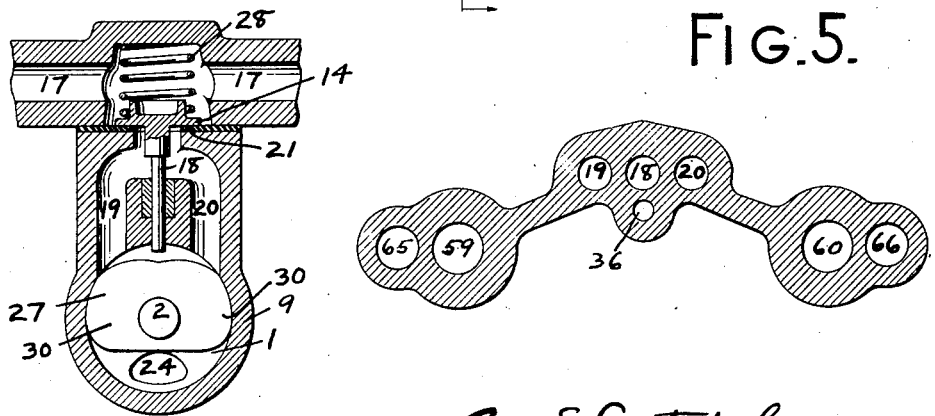
Fig. 4 is a vertical section on the line 4—4 of Fig. 3.
Fig. 5 is a horizontal section on the line 5—5 of Fig. 3.
Figure 6:
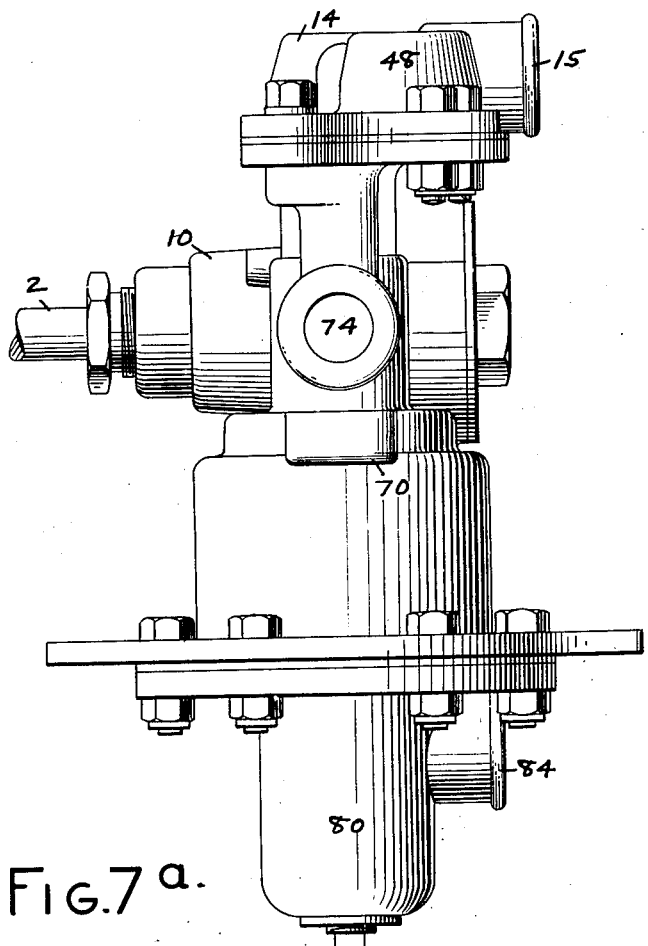
Fig. 6 is an end elevation, looking from the right in Figs. 1 and 2.

The central puppet is opened by means of a cam 27 fixed on the central shaft 2 and adapted, as indicated in Fig. 4, to lift the valve stem 18 in opposition to the spring 28, whenever the handle 4 and cone 1 are rotated through a sufficient angle either way from their vertical or neutral position. A suitable stop device (not shown) may be provided to limit the rotation of the cone and thus prevent the stem 18 from getting behind the cam, where the stem will engage the rear surfaces 30 of the cam. When the cone 1 is in neutral, or substantially in neutral, the central puppet 14 is maintained automatically closed by the spring 28, so that except during actual operation of the valve, there is no supply of air to the reservoir port 25 in the cone. The purpose of this protective feature will be hereinafter described.

The space 31 directly above the cone is open to the atmosphere, in case air is used, or may be connected to a suitable discharge conduit if some other fluid is employed. A pair of channels 33, 34, extend from this atmosphere at 31 to the seat for the cone, and at predetermined positions of the latter one or both of these exhaust channels is in communication with ports formed within the cone.

From the reservoir passages 19, 20, beneath the central puppet 14, there extends downwardly, as indicated in Fig. 3, a safety passage 36, terminating at a point 37 in the cone seat 10, in a plane between the left face 13 of the cone and the left end of the reservoir port 25, and other ports in the cone, so that this safety passage 36 communicates only with the cone or safety port 39, and is at no time in communication with the reservoir port 25 or other ports of the cone. The safety port 39, indicated in dotted lines in Fig. 3, and by a circle in Fig. 8, and in the diagrams shown in Figs. 9 to 14, extends from a point adjacent the lower end of the safety passage 36, to a pair of slots 41, 42, oppositely disposed with respect to the vertical or neutral axis of the cone, and each widened at its rear end, as indicated at 44, 45, in Figs. 3 and 8 to 15. These shouldered or bayonet slots 41, 42, may be referred to for convenience as the left and right exhaust ports respectively, of the cone. From Fig. 9 it will be seen that when the cone is in mid position, these ports 41, 42 communicate through their widened portions 44, 45, with the exhaust channels 33, 34 respectively. This means that with the valve in neutral position, the position it occupies when not in use, any air that leaks past the central puppet 14 and into the passages 19, 20, is exhausted to atmosphere at 31 through the safety passage 36, safety port 39, exhaust ports 41, 42, widened portions 44, 45, of said ports, and exhaust channels 33, 34, thus affording a safe outlet for any air that might leak into the reservoir port 25 of the cone, and preventing accidental operation of the other portions of the valve mechanism, hereinafter described. Such accidental operation might result in dumping the load, perhaps while the car is in motion, with serious consequences, especially if the load happened to be dumped upon an adjoining track. When the cone is shifted, even to a slight extent, either way from neutral, the safety port 39 passes out of the range of the lower end 37 of the safety passage 36, so that during actual operation of the valve, this safety device, comprising the passage 36, port 39, exhaust ports 41, 42, widened portions 44, 45, exhaust channels 33, 34 to atmosphere at 31, is cut off from communication with the reservoir passages 19, 20, chamber 22, reservoir channel 24 and reservoir port 25 of the cone.

In addition to the above elements, which may be said to comprise the central portion of the valve, there is provided at the left and right sides of the valve, Fig. 2, mechanism in duplicate serving to effect the desired circuit changes when the cone 1 is shifted one way or the other from neutral. Considering the mechanism on the left side, shown in sectional elevation in Fig. 2, it will be seen that the reservoir box 17 at the top of the valve extends to a left puppet 47 normally pressed downward into closed position by a spring 49 above the seat 51 of the puppet, and by a second and larger spring 53 pressing downwardly upon a piston 55 adapted to move the stem 59 of the puppet 47 by the rod 61 threaded to said piston. As in the case of the central puppet 14, the reservoir pressure exerted downwardly upon the movable member of the puppet assists the spring in holding the puppet closed. While the left puppet 47 is closed, any air that may leak around or through the puppet passes into the left-cylinder chamber 65 and thence through the safety channel 67 to atmosphere at 69, and similarly any air that may be in the left cylinder 71 (see Figs. 15 to 17) may likewise escape through the left-cylinder port 73 and safety channel 67 to atmosphere at 69. As in the case of the central safety passage 36 and associated parts above described in connection with the central portion of the valve, this safety device at the left portion of the valve insures the prompt exhaust of any air that may leak from the reservoir through or around the left puppet 47 or elsewhere through the valve, to the left-cylinder port 73, and in this way the accidental energizing of the left cylinder is prevented, even though the valve mechanism operate imperfectly.

The piston 55, movable with the left puppet 47, is subjected to pressure from beneath, and this pressure, acting upon a pressure area or surface 75 large enough so that the total pressure thereon will overpower the springs 49, 53, and the pressure of reservoir air downwardly upon the movable member of the puppet 47, lifts the piston 55 and with it the puppet 47, through a displacement great enough to close the exhaust 69 and prevent further passage of air from the left-cylinder chamber 65 or left-cylinder port 73, through the safety channel 67 to atmosphere 69. While the piston 55 and puppet 47 are thus raised by pressure beneath the piston, reservoir air is free to flow from the reservoir port 15 at the top of the valve, through the reservoir box 17, past the puppet 47 through the left-cylinder chamber 65 and left-cylinder port 73 to the left cylinder 71 (Figs. 15 to 17), thus energizing the latter with air obtained directly from the reservoir. When the piston 55 drops again, due to a drop in the pressure beneath it, the closing of the puppet 47 shuts off the supply of air from the reservoir to the left cylinder, and the former outlet for air in the left cylinder and left-cylinder chamber 65, through the safety channel 67, to atmosphere at 69, is reopened.

The pressure required beneath the piston 55 to raise the latter and thereby connect the left cylinder to reservoir, may be obtained in either of two ways. First, by the rotation of the cone 1 clockwise in Figs. 2 and 7 to 15, to bring the reservoir port 25 of the cone opposite the port 77 communicating, as indicated in Fig. 2, with the chamber 79 beneath the piston 55. Or second, by admitting to said chamber 79 compressed air from an external source, as by the operation of a valve elsewhere in the train of cars. The latter method, which may be referred to as the train-operation, will be referred to more at length in connection with Figs. 15 to 17.

The first method of energizing the left chamber 79, that is, by rotating the cone 1 clockwise, serves to admit air from the reservoir port 15 at the top of the valve, through the reservoir box 17, central puppet 14, passages 19, 20, chamber 22 at the rear of the cone, reservoir channel 24 in the cone, reservoir port 25 in the cone, and port 77, to the lower chamber 79. The central puppet 14 is open at this time because a rotation of the valve sufficient to bring the reservoir port 25 of the cone opposite the left port 77, will cause the cam 27 (Fig. 4) to raise the stem 18 of the puppet and open the latter; and as above described, the rotation of the cone through such an angle as this rotates the safety port 39 thereof completely away from the safety passage 36, and the escape of air from the passages 19, 20, through the safety passage 36, safety port 39, slots 41, 42, 44 and 45, exhaust channels 33, 34, to atmosphere at 31, is thus cut off.

When the cone is shifted clockwise from the neutral position indicated in Figs. 2 and 9, to the left-hand dumping position, indicated by the left-hand letter D in Fig. 7, reservoir air passes from the reservoir port 25 in the cone through the left port 77 into the left lower chamber 79 to raise the piston 55 and left puppet 47 and cause the reservoir air to pass through the left cylinder port 73 into the left cylinder, as above described. After the car has been dumped, the handle in Fig. 7 may be returned counter-clockwise to the left-hand release position indicated by the left-hand letter R on the scale plate, where the handle may rest for a moment to permit the piston 55 to drop, and reconnect the left cylinder to atmosphere at 69. The handle may then be further shifted counter-clockwise to neutral, ready for the next operation.

In order to illustrate the operation of the valve in dumping a car toward the right and then in righting the car again, reference may be had to the series of diagrams shown in Figs. 9 to 14. Starting with the handle in the vertical or neutral position, as shown in Fig. 9, the reservoir port 25 at the bottom of the cone is not opposite any of the passages in the cone seat. The left and right ports 77, 78, to the left lower chamber 79 and right lower chamber 80 (Fig. 2), are both cut off from any of the passages in the cone. The reservoir port 25 at this time is connected to atmosphere through the reservoir channel 24, chamber 22 at the rear of the cone (at the left of the cone in Fig. 3), passages 19, 20, shown in Fig. 4, safety passage 36 shown in Fig. 3, safety port 39 in the cone, left and right bayonet slots 41, 42, widened portions 44, 45, of these slots, left and right exhaust channels 33, 34, to atmosphere at 31, Fig. 2. Both the left and right pistons 55, 56, are at this time in their lowermost positions, and the left and right cylinders 71, 72, are connected to atmosphere at 69, 70, respectively, through the ports 73, 74, respectively. The central puppet 14 and left and right puppets 47, 48, are closed.

The handle is first shifted clockwise to the dumping position indicated by the left-hand letter D in Fig. 7, causing the cone to be shifted to the position indicated in Fig. 10. This movement of the handle and cone cuts off the safety passage 36 from the safety port 39 and rotates the cam 27, Fig. 4, and raises the central puppet 14, admitting reservoir air to the reservoir port 25 in the cone. Inasmuch as this reservoir port is now opposite the left port 77, reservoir air is admitted through the latter to the left lower chamber 79, causing the left piston 55 to rise. This shuts off the escape of air from the left cylinder 73 to atmosphere at 69, and raises the left puppet 47, admitting reservoir air through the left-cylinder port 73 to the left cylinder 71. It will be noted further, that the bayonet slots 41, 42, of the cone register with the right exhaust channel 34 and the right port 78 respectively, thereby connecting the right lower chamber 80 to atmosphere through the right port 78, bayonet slots 41, 42, right exhaust channel 34 and to atmosphere at 31, Fig. 2. This causes the right piston 56 to drop, if it has been raised, thereby closing the right puppet 48 and cutting off reservoir air from the right-cylinder port 74 and exhausting the right cylinder through said port 74 to atmosphere at 70. The car now dumps toward the right.

When the dumping is completed, the handle is returned counter-clockwise, in Fig. 7, preferably pausing at the release position indicated by the left-hand letter R on the scale plate, long enough to exhaust the left lower chamber 79 through the left port 77, left exhaust passage 81, left exhaust channel 33 to atmosphere at 31, as indicated in Fig. 11. As above described, this causes the left piston to drop, and permits the left cylinder to become exhausted.

The next movement of the handle is counter-clockwise to neutral. Or, if it is desired to right the car at once, the handle may be shifted counter-clockwise beyond the neutral position, to the dumping position indicated by the right-hand letter D on the scale plate at Fig. 7. The cone is now in the position indicated in Fig. 12, with the left lower chamber exhausting to atmosphere at 31 through the left port 77, bayonet slot 41, and left exhaust channel 33, while reservoir air is admitted to the right lower chamber 80 through the central puppet 14, reservoir port 25 in the cone, and right port 78. The exhausting of the left lower chamber 79 serves to effect or complete, as the case may be, the dropping of the left piston and exhausting of the left cylinder; while the admission of reservoir air to the right lower chamber 80 raises the right piston and energizes the right cylinder. This causes the car to be returned to its normal or horizontal position.

When the car has been righted, the handle is turned clockwise to the release position indicated by the right-hand letter R on the scale plate at Fig. 7. The cone is now in the position indicated in Fig. 13, with the right lower chamber 80 connected to atmosphere through the right port 78, right exhaust passage 82 in the cone, right exhaust channel 34, and to atmosphere at 31. The handle may be left in this release position for a moment, to insure the exhausting of the right cylinder, or it may be at once shifted further clockwise to its original neutral position indicated in Fig. 14, which is a duplicate of Fig. 9.

The above description has been directed principally to the operation of the valve itself. In Figs. 15, 16 and 17, there is illustrated a system of piping illustrating the application of this valve to a dump car, and particularly showing an arrangement of parts whereby a single valve may be utilized to operate simultaneously a plurality of cars. In these figures, the valve is indicated somewhat diagrammatically, together with the supply pipe 91, 92, to the left and right dumping cylinders 71, 72, respectively, the main train-line or brake-line 87 connected through the check-valve 88 to the pipe 89 extending from the reservoir 93 to the valve. The left and right lower chambers 79, 80, of the valves are shown connected to pipes 85, 86, respectively, running the length of the car and provided with flexible hose couplings for connection to the next car; these pipes may be referred to for convenience as the left and right auxiliary train-lines. The cylinder and the work circuits connected therewith may be considered as arranged in sets, the cylinders 71 constituting one set for dumping on one side and the cylinders 72 constituting another set for dumping on the other side. Each dump car is controlled by a pair of cylinders, i. e., one cylinder 71 of one set and one cylinder 72 of the other set coöperating to control the position of the car.

If these auxiliary train-lines 85, 86, are provided, all of the dumping cylinders 71 or all of the dumping cylinders 72 may be simultaneously energized from the valve on the same car as the cylinders, or a similar valve elsewhere in the train may be utilized to operate the cylinders 71, 72, of one or a plurality of cars simultaneously, and this multiple-unit or train-control is one of the features of the present invention. As indicated in Fig. 15, showing the arrangement of parts when the valve is in neutral, it will be seen that with the valve closed, the reservoir 93 may be automatically filled and maintained at a pressure equal to or less than the prevailing train-line pressure, by means of the connection including the check-valve 88 from the train-line 87 to the reservoir 93. When the pressure in the main train-line is reduced, as by applying the brakes to the train, the air does not flow from the reservoir into the train-line because the check-valve 88 prevents any air from returning from the reservoir to the train-line. The central puppet 14 is closed at this time. The left and right pistons 55, 56, are both down, closing the left and right puppets 47, 48, so that the left and right auxiliary train-lines 85, 86, and the dumping cylinders 71, 72, are all deënergized.

In energizing the left-hand dumping cylinder 71, for the purpose of dumping toward the right or righting from the left-hand dumping position, the valve handle 4 is turned clockwise to the position indicated in Figs. 10 and 16. This serves to connect the right-hand cylinder 72 to atmosphere at 70, and energizes the left auxiliary train-line 85 and the left lower chamber 79, causing the left piston 55 to rise and admit reservoir air through the left puppet 47 to the left cylinder 71. And since this left auxiliary train-line pressure is similarly exerted in a corresponding left lower chamber 79 of the valve in each car of the train, it will be seen that the left piston 55 of each valve is simultaneously raised, neglecting for the moment the time required for the flow of air through the left auxiliary train-line. As a result, air is simultaneously admitted from the reservoir on each car, through the left puppet of each valve, to each of the left dumping cylinders 71, and each car is dumped toward the right, or righted from the left-hand dumping position, as the case may be. The valves 47, 48 thus function as relays being energized by fluid from the source of pressure acting against a piston head of large area to cause the opening of the valve passages to permit flow of fluid to the dumping cylinders. An automatic device may be provided to cut off the supply of air to the cylinder when the piston has reached the upper limit of its travel, if desired.

In energizing the right-hand dumping cylinder 72, for the purpose of dumping toward the left or righting from the right-hand dumping position, the valve handle 4 is turned counter-clockwise to the position indicated in Figs. 12 and 17, the operator during this movement preferably holding the valve momentarily at the release position shown in Fig. 11, in order to insure exhausting of the left-hand cylinder 71 before the right-hand cylinder is energized; this preliminary release of one cylinder before the other cylinder is energized is advisable with certain types of dumping mechanism in order to avoid locking of parts or loss of air or time. It will be obvious, however, that unless the dumping mechanism requires this pause at the release position, the valve may be shifted at once from one dumping position to the other, disregarding both of the release positions at all times. When the valve has reached the position indicated in Fig. 17, corresponding to Fig. 12, the left auxiliary train-line 85 is connected to atmosphere through the left lower chamber 79, left port 77, left exhaust passage 81 of the cone, left exhaust channel 33, to atmosphere at 31. This causes the left piston to drop, if it has been raised, and cuts off the supply of reservoir air through the left puppet 47 to the left cylinder 71 and opens the left cylinder to atmosphere at 69. Simultaneously the right auxiliary train-line 86 and right lower chamber 80 are energized through the reservoir port 25 of the cone and the right port 78, causing the right piston 56 to rise and admit reservoir air through the right puppet 48 to the right cylinder 72. And since this right auxiliary train-line pressure is similarly exerted in a corresponding right lower chamber 80 of the valve in each car of the train, it will be seen that the right piston 56 of each valve is simultaneously raised, neglecting for the moment the time required for the flow of air through the right auxiliary train-line. As a result, air is simultaneously admitted from the reservoir on each car, through the right puppet of each valve, to each of the right dumping cylinders 72, and each car is dumped toward the left or righted from the right-hand dumping position, as the case may be.

There may be one or more of the dumping cylinders 71, 72, on each side of the car, depending upon the length and capacity of the car, and other factors incident to manufacturing cost and the nature of the service expected of the car.

The valve is preferably mounted upon the center sill at one end of the car, so that the handle 4 of the valve may be readily shifted by an operator standing on the platform or on the ground. At a point adjacent the valve, connection is made from the brake line or main train-line 87, as above described, through the check-valve 88 to the pipe 89 connecting the reservoir 93 with the valve. The reservoir pipe 89, auxiliary train-lines 85, 86, and supply pipes 91, 92, to the dumping cylinders 71, 72, are carried in protected positions upon the center sill, and the brake-line is preferably carried inside the center sill as far as possible, in order to protect the piping from accidental blows that might injure it.

In the above description and the accompanying claims the word valve is used in a generic sense. The term train-line is used in the broad sense to define the work-circuit such as illustrated in the accompanying drawing or any equivalent thereof. The description of the arrangement of the parts as at the right, left, above and below is of course merely illustrative and for convenience of description.

In view of the above, it will be seen that the several objects of the invention are achieved and other advantageous results attained.

As various possible embodiments might be made of the above invention and as various changes might be made in the embodiments above set forth, it is to be understood that all matter herein set forth or shown in the accompanying drawings is to be interpreted as illustrative and not in a limiting sense.

Having thus revealed our invention, we claim and desire to secure by Letters Patent of the United States:

1. In apparatus of the class described, in combination, a distributing member having a neutral and an operating position, a relay energized by fluid passing from a source of pressure through said member to said relay, means automatically cutting off said member from said source of pressure when said member is in neutral position, a work circuit energized from said source through said relay when the relay is energized, and connections for automatically exhausting said work circuit when the relay is deënergized.

2. In apparatus of the class described, in combination, a distributing member having a neutral and a plurality of operating positions, a plurality of relays alternatively energized from said distributing member to energize corresponding work circuits when said member is shifted alternatively to one of its operating positions, and connections whereby one of said circuits is exhausted when another circuit is energized.

3. In apparatus of the class described, in combination, two sets of cylinders arranged in pairs, a reservoir for each pair, and valves adapted to connect the reservoirs alternatively to one or the other set of cylinders, and for exhausting one set when the other set is energized.

4. A valve comprising a movable distributing member, a pair of pistons selectively energized by the movement of the distributing member into one or another of its operating positions, a handle for shifting the distributing member, means preventing removal of the handle except when the distributing member is in neutral position, and means disconnecting said distributing member automatically from its source of pressure when said member is in neutral position.

5. A valve comprising a movable distributing member, a pair of pistons selectively energized by the movement of the distributing member into one or another of its operating positions, a handle for shifting the distributing member, means preventing removal of the handle except when the distributing member is in neutral position, and means disconnecting said distributing member automatically from its source of pressure when said member is in neutral position, the connection between the source of pressure and the distributing member being effected automatically by the movement of the distributing member into either of its operating positions.

6. In apparatus of the class described, in combination, left and right puppets normally closed, a distributing member adapted when shifted to left operating position, to open the left puppet, and when shifted to right operating position, to open the right puppet, connections from a source of pressure to the distributing member, left and right pistons associated respectively with the left and right puppets, and adapted when energized to open the respective puppet, connections from the distributing member to said pistons to energize the latter selectively when said member is shifted into one of its operating positions, and left and right work circuits connected to a source of pressure through the left and right puppets respectively.

7. In apparatus of the class described, in combination, a central puppet normally closed, left and right puppets normally closed, a distributing member adapted when shifted to left operating position to open the central and left puppets, and when shifted to right operating position to open the central and right puppets, connections from a source of pressure through the central puppet to the distributing member, left and right pistons associated respectively with the left and right puppets, and adapted when energized to open the respective puppet, connections from the distributing member to said pistons to energize the latter selectively when said member is shifted into one of its operating positions, left and right work circuits connected to a source of pressure through the left and right puppets respectively, and an exhaust from the distributing member to atmosphere automatically closed when said member is shifted into any of its operating positions.

8. In apparatus of the class described, in combination, a distributing member movable from neutral to either of two operating positions to energize selectively one or the other of a pair of pneumatic relays, a cylinder associated with each relay to be energized by the operation of the respective relay, connections from said distributing member to atmosphere to maintain said relays automatically exhausted when said member is in neutral position, and means normally preventing the energizing of the cylinders except when the relays are energized.

9. In apparatus of the class described, in combination, a distributing member movable from neutral to either of two operating positions to energize selectively one or the other of a pair of pneumatic relays, a cylinder associated with each relay to be energized by the operation of the respective relay, means automatically disconnecting said distributing member from a source of pressure when said member is in neutral position, and means normally maintaining said distributing member in neutral position.

10. In apparatus of the class described, in combination, a distributing member having a neutral and two operating positions, a pair of work circuits adapted to be energized selectively when said member is in one or the other of its operating positions, and to be exhausted when said member is in neutral, and relays interposed between the distributing member and the work circuits, and adapted to energize said work circuits when said relays are operated.

11. In apparatus of the class described, in combination, a movable member, ports therefrom to a reservoir and to atmosphere, a puppet comprising a piston, a port from said member to a pressure surface movable with said piston and adapted to operate said piston when said member is moved to connect said reservoir with said surface, a port from said reservoir to a smaller pressure surface movable with said piston, whereby reservoir pressure on said second surface opposes reservoir pressure on said first surface when said member is moved to operative position, a puppet in the channel from the reservoir to said member, a cam movable with said member, and a follower therefor movable with said puppet, the cam being designed to move said follower to open said puppet when said member is in operating position, said puppet being closed when said valve is in neutral, the port from the movable member to atmosphere being open when said movable member is in neutral position and closed when said member is in operative position.

In testimony whereof, we have signed our names to this specification the 26th and 27th days of October, 1916, respectively.

ROY E. CARTZDAFNER.
HORACE A. KETCHAM.